US007515574B2

(12) United States Patent
Huang et al.

(10) Patent No.: US 7,515,574 B2
(45) Date of Patent: Apr. 7, 2009

(54) SCHEDULING METHOD FOR SUPPORTING QUALITY OF SERVICE (QOS) IN WIRELESS LOCAL AREA NETWORK (WLAN)

(75) Inventors: Ching Yao Huang, Hsinchu (TW); Yu Long Fan, Taoyuan (TW)

(73) Assignee: National Chiao Tung University, Hsinchu (TW)

( * ) Notice: Subject to any disclaimer, the term of this patent is extended or adjusted under 35 U.S.C. 154(b) by 590 days.

(21) Appl. No.: 11/181,463

(22) Filed: Jul. 14, 2005

(65) Prior Publication Data
US 2006/0233190 A1    Oct. 19, 2006

(30) Foreign Application Priority Data
Apr. 15, 2005  (TW) .............. 94111947 A

(51) Int. Cl.
*H04W 4/00* (2006.01)
(52) U.S. Cl. .............. 370/338; 370/230; 370/447; 370/449
(58) Field of Classification Search ............... 370/388, 370/349, 230, 338, 447, 449
See application file for complete search history.

(56) References Cited
U.S. PATENT DOCUMENTS
6,049,549 A   4/2000  Ganz et al.

| 6,747,968 B1 | 6/2004 | Seppälä et al. |
| 7,006,530 B2* | 2/2006 | Spinar et al. ............. 370/468 |
| 2002/0181417 A1* | 12/2002 | Malhotra et al. ........... 370/329 |
| 2007/0217385 A1* | 9/2007 | Meier ..................... 370/338 |

OTHER PUBLICATIONS

YuLong Fan; ChingYao Huang; YuRu Hong, "Timer based scheduling control algorithm in WLAN for real-time services," Circuits and Systems, 2005. ISCAS 2005. IEEE International Symposium on , vol., No., pp. 4533-4537 vol. 5, May 23-26, 2005.*
L.W. Lim, R. Malik and P.Y. Tan "A Qos Scheduler for IEEE 802.11e WLANs," IEEE CCNC, 2004.
Z. Zhao, L. Zhang, et al "An Efficient Real-Time Traffic Scheduling Algorithm in Wireless Networks," IEEE CCECE, 2003.

* cited by examiner

*Primary Examiner*—Derrick W Ferris
*Assistant Examiner*—Omar Ghowrwal
(74) *Attorney, Agent, or Firm*—Bucknam and Archer

(57) ABSTRACT

A method for polling of stations in a Wireless Local Area Network (WLAN), including the steps of: obtaining Quality of Service (QoS) information related to the stations; assigning two timers to each WLAN service requiring QoS guarantee, one for uplink transmission and the other for downlink transmission; starting a Controlled Access Period (CAP) when a minimum timer $T_m$ is below the threshold $T_{thr}$; polling the station with the minimum timer; updating the minimum timer after a polling message is sent; quitting CAP and permitting the resource contention if the minimum timer $T_m$ is larger than the threshold $T_{thr}$.

8 Claims, 2 Drawing Sheets

SCHEDULING METHOD FOR SUPPORTING QUALITY OF SERVICE (QOS) IN WIRELESS LOCAL AREA NETWORK (WLAN)

FIELD OF THE INVENTION

This invention is related to a scheduling method for supporting quality of service (QoS) in wireless local area network (WLAN), more particularly to a scheduling method of the hybrid coordination function for supporting quality of service, which is able to support quality of service of the real-time audio/video services.

PRIOR ART OF THE INVENTION

Currently, the protocol used in Wireless area Network (WLAN) in IEEE 802.11 comprises a physical layer (PHY) and a media access control (MAC) layer. The MAC layer defines 2 methods for the access: namely, discrete coordination function (DCF) and point coordination function (PCF), wherein the DCF is a discrete control scheme mainly for competition and the PCF is a central control scheme. Due to simplicity, the PCF is widely used; however, it can only provide the specific quality of service (QoS) without clear guarantee. In addition, the scheme mainly for competition often collides with each other unavoidably, which deteriorates under a heavy transmission load. Furthermore, because the PCF employs the polling method and needs an Access Point of WLAN that is responsible for media control, the Station is allowed to send a data packet only after it receives the polling messages from the Access Point. Therefore the PDF has some limitation: when the table of polling is too long, it can not provide the station with a strict delay boundary in time, and the request for QoS can not be carried out accordingly.

The protocol of IEEE 802.11e mentions 2 schemes: hybrid coordination function (HCF) and enhanced discrete coordination function (EDCF); where the EDCF is the extension version of DCF; namely, IEEE 802.11e protocol is designed to provide supporting to quality of service to the HCF and the EDCF. However, for the services for the real-time audio/video (i.e. audio frequency/video frequency), each of the data packets itself has a delay boundary. If the data packet is not received before the delay boundary, then the transmission of the data packet becomes invalid and it will be discarded. Which will thus produce a longer delay and a higher data packet loss rate. However, the EDCF defined by IEEE 802.11e protocol provides only a specific QoS mainly for competition, and the HCF needs a better scheduling to implement the request for QoS. Therefore, the EDCF and HCF are not suitable on the applications of the real-time services, and they can not provide a consistent quality of service.

Therefore, there is a demand for a reliable scheme to guarantee the QoS for those real-time services. The U.S. Pat. No. 6,049,549 discloses a media control method, which employs the polling manager and resources manager to support the transmitting the QoS of data flow. However, because the patent uses a polling scheme which is completely centralized, under a heavy flow load, the AP must have a large scale processor and a large volume of negotiation between stations, which creates a longer idle time for the AP. In addition, the patent does not set forth the importance of the delay boundary to the real-time services, and thus wastes much of the bandwidth in transmitting the invalid data packets. Also, the U.S. Pat. No. 6,747,968 discloses a weighted PCF polling table for QoS in WLAN, wherein a AP assigns a weighted polling factor to every WLAN terminal according to the information provided by the QoS, and implements polling among the WLAN terminals according to the weighted polling factor during the transmission period. However, the patent does not set forth how to determine the individual weighted polling factor for each of the WLAN terminals nor the importance of the delay boundary to the real-time services.

Therefore, there is a demand for developing a more suitable method for polling scheduling to meet the requirements for real-time services so as to control the access delay and data loss rate of the real-time services.

SUMMARY OF THE INVENTION

To solve the aforementioned technical problems, the object of this invention is to provide a method of scheduling for supporting quality of service in wireless local area network, which can provide supporting quality of service on real-time audio frequency/video frequency services by means of a sophisticated polling method with novelty.

To achieve the above object, the invention provides a polling method used in the WLAN stations, which comprises: Obtaining Quality of Service (QoS) information related to the stations; Assigning two timers to each WLAN service requiring QoS Guarantee, one for uplink transmission and the other for downlink transmission; Starting a Controlled Access Period (CAP) when a minimum timer Tm is below the threshold Tthr; Exchange message with the station with the minimum timer (based on the need for polling, or downlink and polling); Updating the minimum timer after polling message is sent; and Quitting CAP and permitting the resources contention for other stations if the minimum timer Tm is larger than the threshold Tthr.

Furthermore, according to the above polling method in the invention, the timer for the uplink transmission is set as $Tu=Te+DB-To$, where Te is the estimated time when generating a frame, DB is a delay boundary, and To is the time for exchanging the frame order.

Furthermore, according to the above polling method in the invention, the timer for the downlink transmission is set as $Td=DB-Age-Tt$, where DB is a delay boundary, Age is the time for the frame during media access control (MAC) layer, and Tt is the time needed for transmitting the frame.

Furthermore, according to the above polling method in the invention, the timer for the uplink transmission is updated as $Tu,new=Tu,old+Tint$, where Tu,old is the time left on the timer previously after sending out the polling message, and Tint is the time interval between the frame arrivals.

In addition, according to the above polling method in the invention, the threshold is calculated based on the current data flow load of the Access Point in the WLAN, or the threshold is associated to a permitted value about some related information.

DETAILED DESCRIPTION OF THE INVENTION

Figure 1:
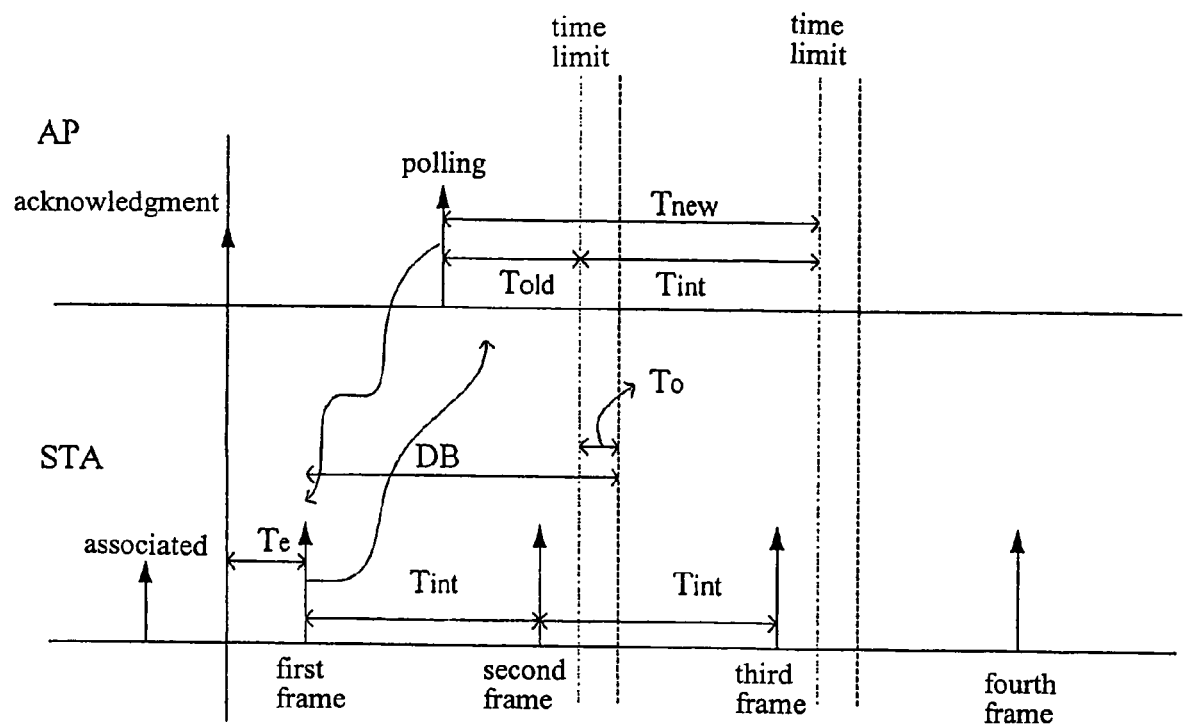
FIG. 1 describes the relationship of the uplink transmission timer in the embodiment of the invention.
Figure 2:
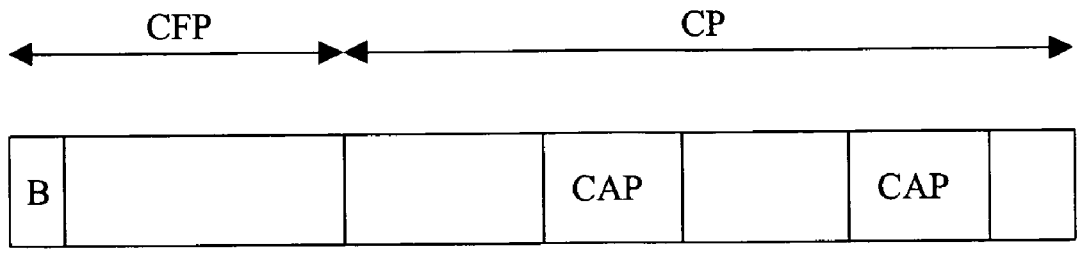
FIG. 2 describes the structure of a superframe in the embodiment of the invention.
Figure 3:
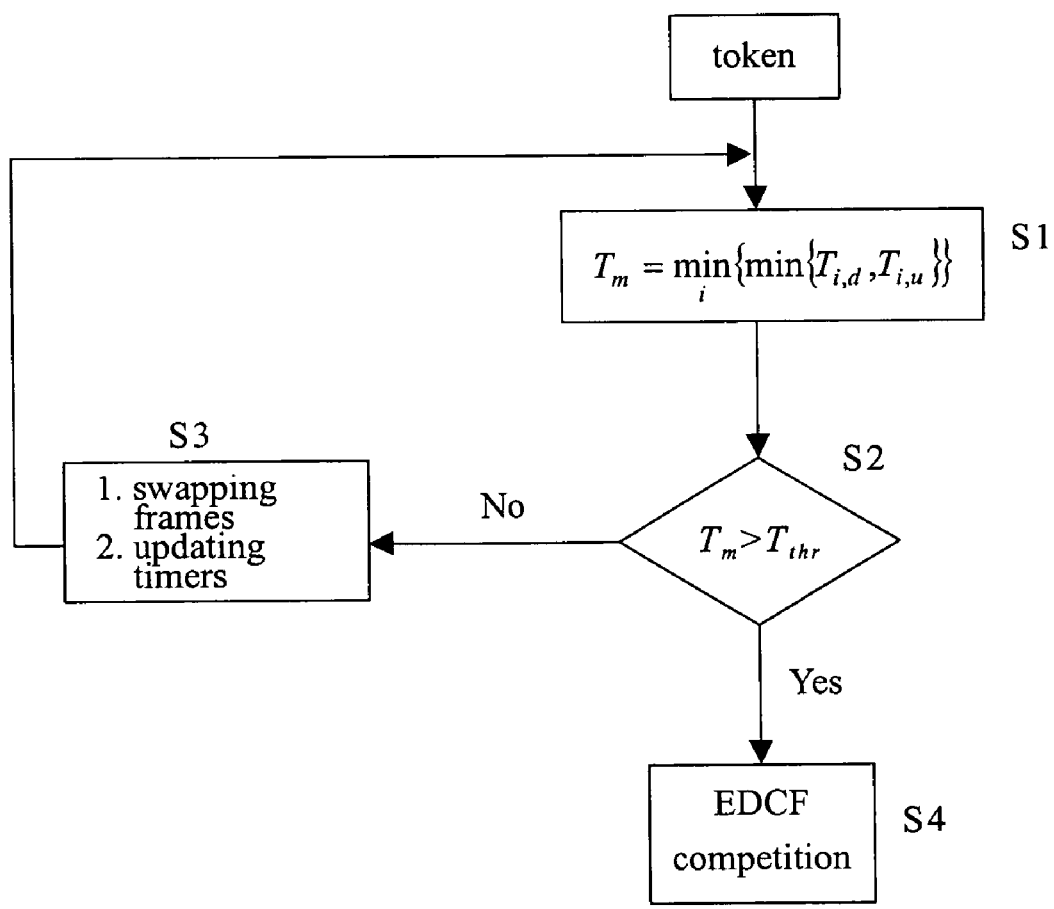
FIG. 3 is a flow chart that shows the steps of the polling method according to the embodiment of the invention.

The embodiment will be described by referring to the attached drawings. Although the invention is explained by means of the embodiment and of referring the attached drawings, it should also be understood that various changes and modifications are obvious to those of ordinary skill in the art. Therefore, unless those changes and modifications obviously violate the spirit and scope claimed in this invention, otherwise they should be considered inclusive in this invention.

First, provided that there are a few stations having real-time audio frequency/video frequency data services and there are several stations having preferred results. According to the invention, the Access Point in the WLAN will setup 2 timers in bi-directional services: one is used for downlink transmission and the other one is used for uplink transmission. Whenever time proceeds, the timer will count down backward. Because every service has its own arrival interval speed and delay boundary, therefore according to the scheduling method of the invention, the timers can be used to represent how far the frame is away from the time limit.

Next, set the downlink transmission timer Td (i.e. the time limit for downlink):

$$T_d = DB - Age - T_t \qquad (1)$$

where DB is delay boundary, Age is the time for the frame during media access control (MAC) layer, and Tt is the time needed for transmitting the frame. As mentioned above, it is obvious to understand that the station having the service should downlink the polling before the timer counts down to zero.

By using the same way as the above to operate another timer, i.e. the uplink transmission timer Tu (i.e. the time limit for uplink). The Drawing 1 shows the relationship in the uplink transmission timer, which is set as:

$$T_u = T_e + DB - T_o \qquad (2)$$

where Te stands for the estimated time when generating a frame, and To stands for the time for exchanging the frame order. The uplink transmission timer is set after the Access Point receives the request from a station (associated), then the Access Point sends out an Acknowledge to inform the station and estimate the time limit for uplink transmission on the frame (i.e. the first frame).

After polling the station, the uplink transmission is updated as:

$$T_{u,new} = T_{u,old} + T_{int} \qquad (3)$$

where Tu,old is the number left on the uplink timer Tu, and the Tint is the time interval between the frames ( i.e. the data packets) arrivals. At this moment, the Access Point collects all those timers and exchanges message with the station of the minimum timer Tm (polling, or downlink and then polling as needed), and the mathematic formula for determining the priority order is represented as:

$$T_m = \min_i \{\min\{T_{i,d}, T_{i,u}\}\} \qquad (4)$$

In addition, if the uplink transmission timer has been timed out before polling on a station, then the Access Point should discard the frame and update the timer as aforementioned formula (3).

After explaining the polling mechanism, the operation steps for the Access Point according to the invention will be described as following.

The drawing 2 is the structure of a superframe from an embodiment of the invention. The structure of the superframe of the invention is consisted of a Completion-Free Period (FP) and followed by a Competition Period (CP); wherein the Access Point will calculate a particular threshold Tthr based on the current flow load; once the minimum timer Tm is smaller than the threshold Tthr, the Access Point will initiate the Control Access Period (CAP) (Here, we consider that the CP is an instance of CAP). On the other hand, if the minimum timer Tm is larger than the threshold Tthr, then the resource will be released and will be utilized by a CP.

The drawing 3 is a flow chart, which shows the polling steps according to an embodiment of the invention. The step S1 calculates the minimum timer Tm. The step S2 determines if the minimum Tm is smaller than the threshold Tthr; if the minimum Tm is smaller than the threshold Tthr, then the flow goes to step S3 and initiates a CAP; otherwise, the flow goes step S4 and initiates a CP. On the step S3, the AP exchanges a frame with the station with minimum timer and updates its timer; after that, the AP will repeat the step S1 and step S2; if the Tm is still smaller than the threshold , then the flow repeats the step S3; otherwise, the flow goes to step S4, the CEF ends and starts a CP. However, when a superframe ends, the AP should hold the current polling, send an indexed frame and start a CFP.

On the invention, the threshold Tthr effects the system performance significantly. If the threshold is too large, which will create a biased pressure, and thus lower the system data flow. On the contrary, if the threshold Tthr is too small, which will create a serious service delay. Therefore, there must exist a appropriate compromise between the delay on real-time service and the data flow of non real-time service. The Equation (5) describes the relationship between the threshold Tthr and the packet delay, where D stands for the packet delay:

$$D \cong DB - T_m \geq DB - T_{thr} \Rightarrow T_{thr} \geq DB - D \qquad (5)$$

To provide the variety of services, and to consider the requests for urgent services, the Equation (5) could be modified as the Equation (6):

$$T_{thr} \geq \min_i \{DB_i\} - D \qquad (6)$$

Considering a reasonably assumed object delay Dobj, the Equation (6) could be modified as Equation (7):

$$T_{thr} \geq \min_i \{DB_i\} - D_{obj} \qquad (7)$$

As mentioned above, the Equation (7) shows that to obtain the object delay Dobj, the threshold Tthr must be at least larger than a pre-determined value. Generally speaking, the delay increases as the load; therefore, it is impossible to transmit a heavy load with a small amount of object delay. This will bring down the data flow of the non real-time services significantly, and the delay problem on the real-time services can not be improved either. Therefore, it is suggested that the system provider set up the threshold conservatively. To simplify, the system provider can create a comparison table, which lists the relationship between various data flow loads and their corresponding threshold values. Simply speaking, the system always needs a compromise capable of making a system provider to modify the threshold value according to the corresponding object.

The Quality of Service (QoS) aforementioned is a network system or a network component that provides the communication function between the related users including also the network performance like the definition and the measurement of bit rate, delay, shake, packet loss rate, etc.

As stated earlier in the invention, the Access Point (AP) sets up the timers for various services, and does the polling for the station with the timer of the minimum value; because the AP provides the data packet (i.e. frame) that is the closest to the delay limit first, it thus controls the access delay and the loss rate of real-time services. Additionally, in a period without any station polling, the AP will terminate the CAP, then EDCF will take place and transmit a frame with the best-effort services. Therefore, the flexible CAP time of the invention will reduce the waste on time, meanwhile, and will protect the resources of non real-time services.

The invention has been explained with a particular embodiment, but it is not limited only to the described embodiment. It should be known for those skill in the field that various variants and modifications can be achieved without departing the spirit and the scope of the claims of the invention.

What is claim is:

1. A method for polling of stations in a wireless Local Area Network (WLAN), which comprises the steps of:
    obtaining Quality of Service (QoS) information related to the stations;
    assigning two timers to each WLAN service requiring QoS Guarantee, one for uplink transmission and the other for downlink transmission, wherein the timer for uplink transmission is set as $Tu=Te+DB-To$, where Te is the estimated time when generating a frame, DB is a delay boundary, and To is the time for exchanging the frame order;
    starting a Controlled Access Period (CAP) when a minimum timer Tm is below a threshold Tthr;
    exchange message with the station with the minimum timer (based on the need for polling, or downlink and polling);
    updating the minimum timer after polling message is sent; and
    quitting CAP and permitting the resources contention for other stations if the minimum timer Tm is larger than the threshold Tthr.

2. The method of claim 1, wherein the uplink timer is updated as $Tu,new=Tu,old+Tint$, where Tu,old is the time left on the timer previously after sending out the polling message, and Tint is the time interval between the frame arrivals.

3. The method of claim 1, wherein the threshold is calculated by an Access Point based on current flow load.

4. The method of claim 1, wherein the threshold is associated to the information of a permitted control.

5. A method for polling of stations in a wireless Local Area Network (WLAN), which comprises the steps of:
    obtaining Quality of Service (QoS) information related to the stations;
    assigning two timers to each WLAN service requiring QoS Guarantee, one for uplink transmission and the other for downlink transmission, wherein the timer for downlink transmission is set as $Td=DB-Age-Tt$, where DB is a delay boundary, Age is the time for the frame during media access control (MAC) layer, and Tt is the time needed for transmitting the frame;
    starting a Controlled Access Period (CAP) when a minimum timer Tm is below a threshold Tthr;
    exchange message with the station with the minimum timer (based on the need for polling, or downlink and polling);
    updating the minimum timer after polling message is sent; and
    quitting CAP and permitting the resources contention for other stations if the minimum timer Tm is larger than the threshold Tthr.

6. The method of claim 5, wherein the uplink timer is updated as $Tu,new=Tu,old+Tint$, where Tu,old is the time left on the timer previously after sending out the polling message, and Tint is the time interval between the frame arrivals.

7. The method of claim 5, wherein the threshold is calculated by an Access Point based on current flow load.

8. The method of claim 5, wherein the threshold is associated to the information of a permitted control.

* * * * *